C. M. MOTTE.
POWER ACTUATED BALANCE PLOW.
APPLICATION FILED MAY 25, 1918.

1,355,409.

Patented Oct. 12, 1920.
5 SHEETS—SHEET 4.

Inventor:
Charles Marius Motte
per H. W. Plucker
Attorney.

C. M. MOTTE.
POWER ACTUATED BALANCE PLOW.
APPLICATION FILED MAY 25, 1918.
1,355,409.
Patented Oct. 12, 1920.
5 SHEETS—SHEET 5.
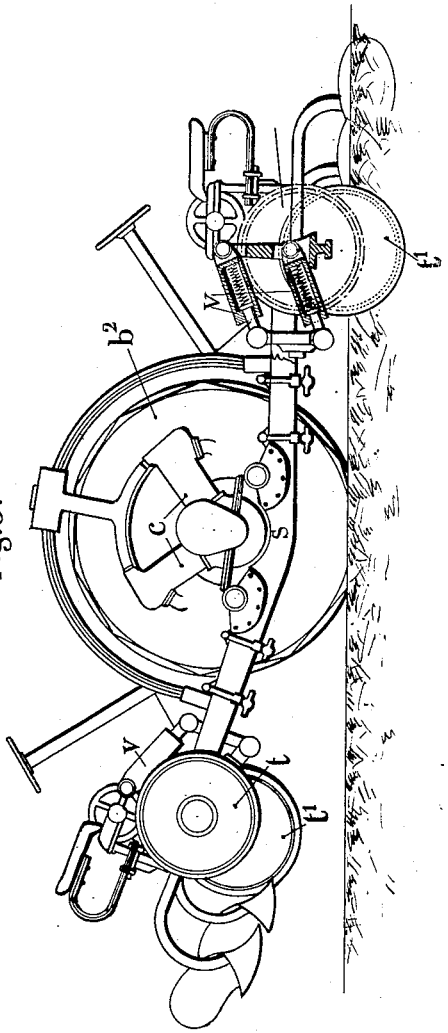
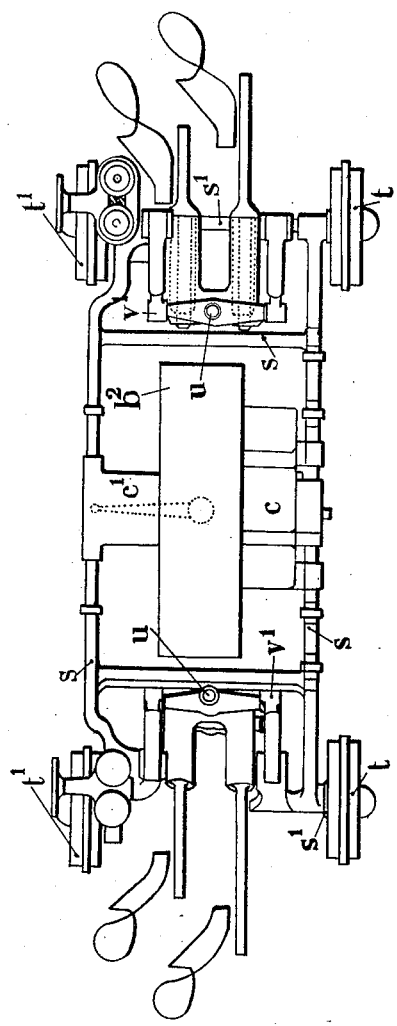
Inventor:
Charles Marius Motte
per H. W. Plucker
Attorney.

UNITED STATES PATENT OFFICE.

CHARLES MARIUS MOTTE, OF PARIS, FRANCE.

POWER-ACTUATED BALANCE-PLOW.

1,355,409.

Specification of Letters Patent. Patented Oct. 12, 1920.

Application filed May 25, 1918. Serial No. 236,633.

*To all whom it may concern:*

Be it known that I, CHARLES MARIUS MOTTE, of No. 53 Avenue Secretan, Paris, France, engineer, have invented a Power-Actuated Balance-Plow, of which the following is a full, clear, and exact description.

The present invention relates to a power-actuated plow of that kind comprising two groups of plow shares arranged obliquely with respect to one another and working alternately.

Plows at present in use are generally hauled either by an independent tractor constituting an automobile vehicle moving very slowly, or by a cable wound on a drum and passing through a fixed point.

In the former case, when the plow is hauled by a tractor, the headlands or clear spaces reserved at the ends of the field to enable the machines to turn around, are of large dimensions, for a balance plow comprising a separate tractor is of considerable length. These headlands or clear spaces subsequently have to be plowed by means of a plow drawn by animal traction.

Furthermore at the end of each displacement in one direction it is necessary to turn the machine around, and this occupies a certain amount of time, and moreover this method of plowing requires two drivers, one seated on the tractor and one seated on the plow.

With capable haulage the headlands are not quite so large, but this method of plowing requires a larger number of hands, and since it is necessary to displace the drum and the fixed point at both ends of the field, great losses of time result therefrom.

The balance plow forming the subject-matter of the present invention is so arranged as not to make it necessary to execute complicated maneuvers at the end of the land to be plowed. All that is necessary is to shift the plow sidewise a distance equal to the width of the group of furrows to be plowed and then bring the end of the plow previously out of operation into active effect when it will be ready to resume work.

Furthermore a plow according to the present invention is simple and strong and does not require many hands to actuate it as plows heretofore used.

The plow according to the present invention is essentially characterized by the fact that the motor is mounted on a hollow axle extending between the two groups of plow shares or plow bodies, said axle resting in the rotary hollow hub or hubs of one or two driving and steering wheels driven by the motor through suitable connections extending through the hollow axle.

The present invention is also characterized by the construction of the motor, and by the arrangement of the groups of plow bodies, more particularly by the method of mounting these bodies, enabling each of the latter to receive a lateral displacement independently of the other bodies.

By way of example the invention is illustrated in the accompanying drawing, in which:—

Figs. 6 and 7 show a balance plow comprising only one driving and steering wheel.

Fig. 8 shows, on an enlarged scale, a portion of the driving gear illustrated in Fig. 3.

Figure 1:
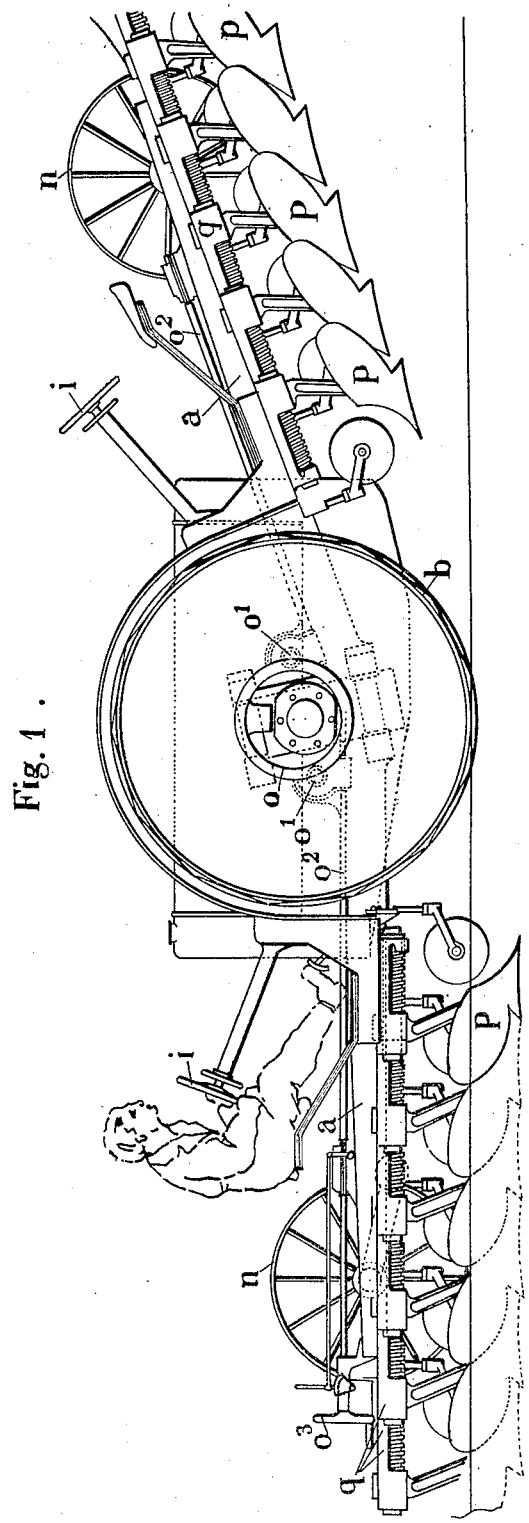
Figure 1 shows an elevation of a balance plow with two driving and steering wheels.
Figure 2:
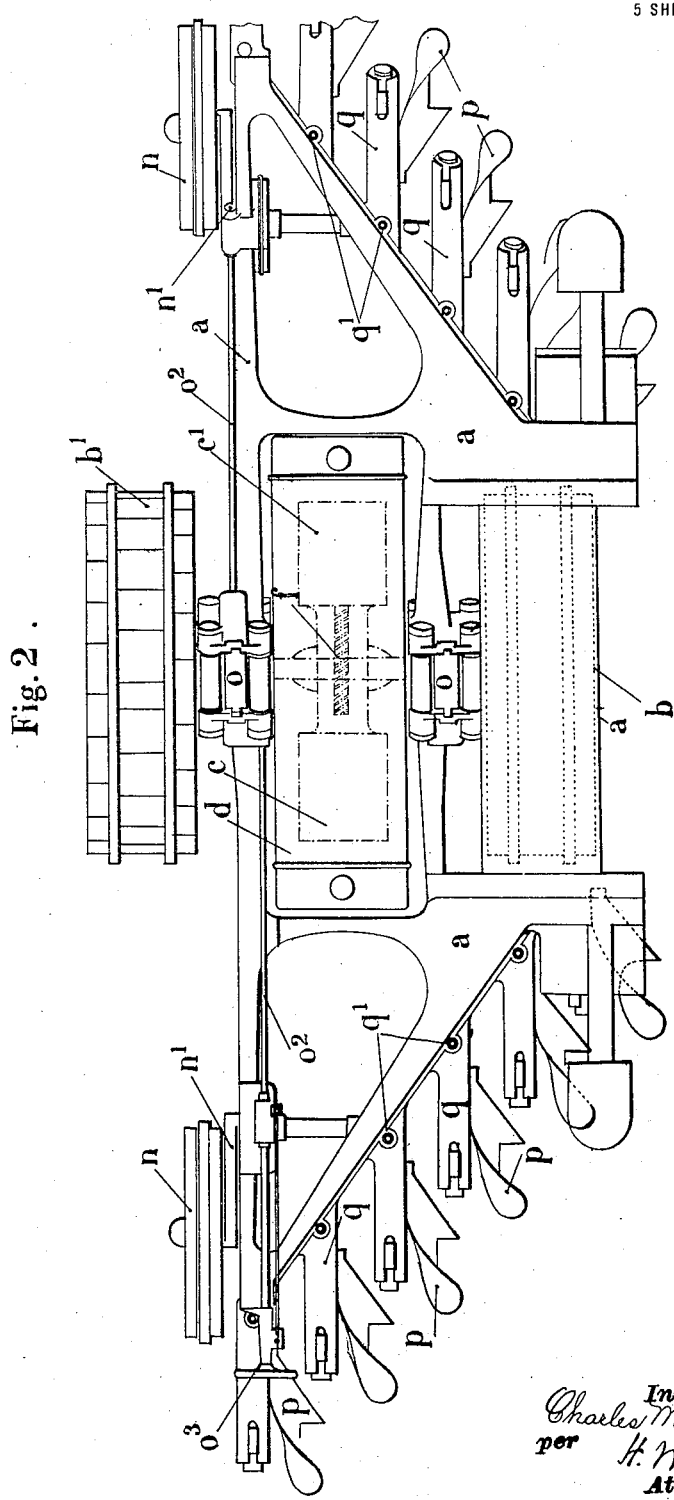
Fig. 2 is a corresponding plan.
Figure 3:
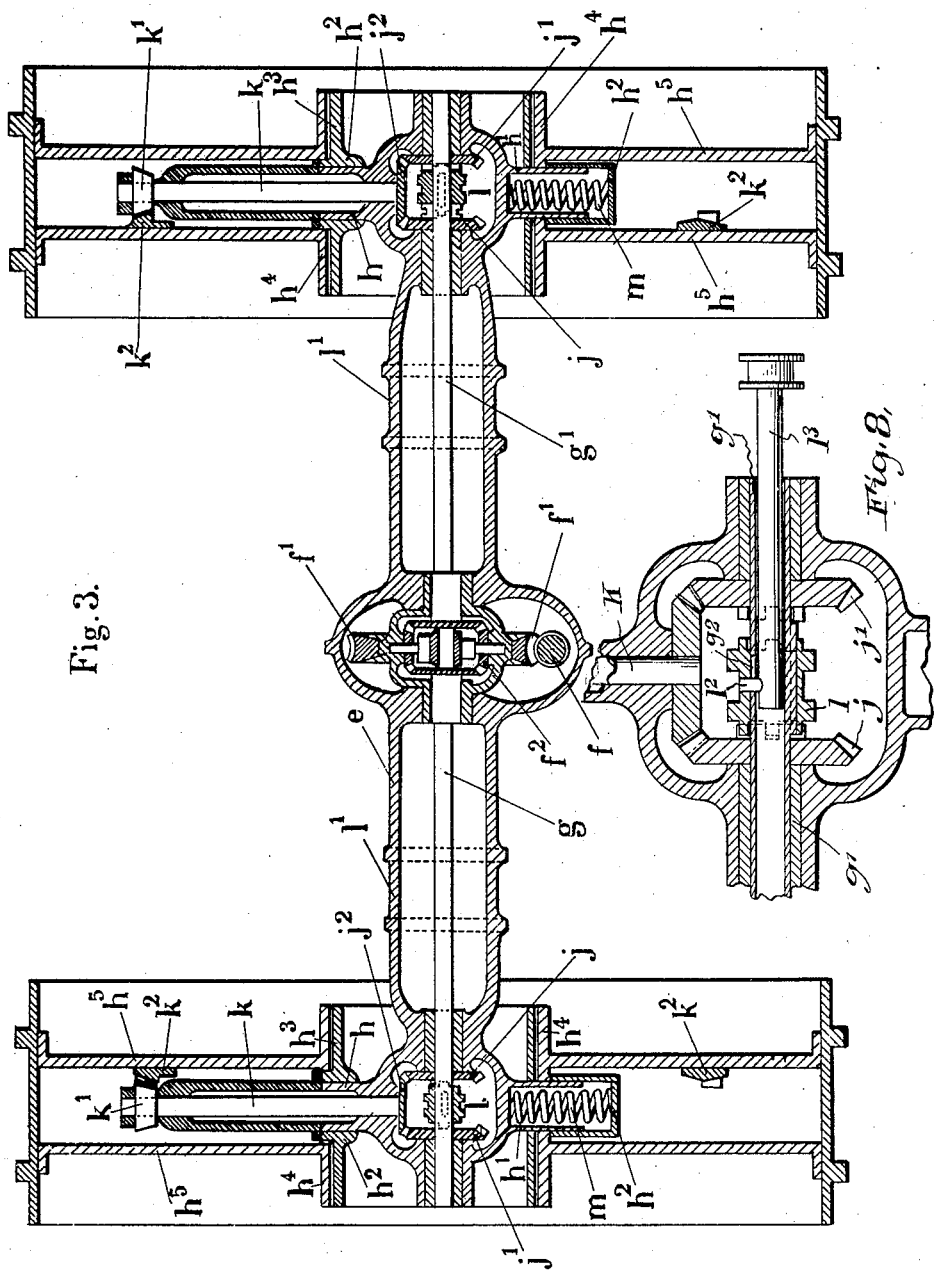
Fig. 3 is a cross-sectional elevation on a larger scale, of the driving and steering wheels.

It will be seen from Figs. 1 to 5 of the drawings the present balance plow comprises a frame $a$, which is slightly V-shaped in a vertical plane, and the extremities of which, supporting the plow bodies, are arranged obliquely.

In the middle part of the apparatus is arranged the motor consisting of two driving and steering wheels $b$ and $b'$.

These two wheels are driven by a motor $c$, actuating through the medium of a driving shaft, a clutch and change speed gearing $c'$. The said motor and its driving members are located in a casing $d$ placed between the two wheels $b$ and $b'$.

The motion of the motor $c$ is transmitted to the latter in the following manner:—

The wheels $b$ and $b'$ are mounted at the ends of a hollow axle $e$, connected to the frame $a$.

The change-speed gear located in the casing $d$ actuates a worm $f$ gearing with a worm wheel $f'$, which transmits motion, through the medium of a differential $f^2$ to two horizontal shafts $g$ and $g'$ which are located in the axis of the hollow axle $e$ and upon which the wheels $b$ and $b'$ rotate.

With this end in view each of the wheels $b$ and $b'$ can rotate about two trunnions $h$ $h'$ placed in the vertical plane of the wheel and integral with the axle $e$. These trunnions are engaged in two sleeves $h^2$ virtually integral with a hub $h^3$ upon which rims $h^4$ can turn to which are fixed flange rings $h^5$ supporting the rim of the wheel.

Those angular displacements are communicated to the wheels by means of a lever provided with a toothed sector meshing with a pinion keyed on to the shaft of the steering hand wheels $i$.

Inside the support of the trunnions $h$ and $h'$ of each wheel is arranged a set of bevel gear wheels, comprising the pinions, $j$, $j'$ and $j^2$. The pinion $j^2$ is virtually integral with a shaft $k$ bearing a pinion $k'$, gearing with a toothed rim $k^2$ virtually integral with one of the flange rings of the wheel and permitting of the driving thereof. The pinions $j$ and $j'$ are loosely mounted on the shaft $g'$ and are adapted to be alternately engaged by a longitudinally slidable clutch member or sleeve $l$ driven by the shaft $g'$. According as the sleeve $l$ engages the pinion $j$ or $j'$, the shaft $k$, and consequently the driving wheel, will be rotated in one direction or in the opposite direction. The longitudinal movement of the sleeve $l$ is imparted thereto by means of an actuating rod $l^3$ (Fig. 8) slidably mounted in the hollow shaft $g'$ and provided at one end with a projection $l^2$ which extends through a longitudinal slot $g^2$ in said shaft and engages the clutch sleeve $l$.

On the axle $e$ are formed two bearings $l'$, upon which are fixed the lifting sides of the plow and this axle rests on two damping springs $m$.

At each end of the frame $a$ are arranged the parts necessary for adjusting the height of the plow bodies. The supporting wheel $n$ of each part of the plow is mounted on a cranked axle $n'$ pivoting about an axis of articulation in such a way as to permit of the depth or draft of the plow shares to be varied.

The lifting of each part of the plow is effected by means of a device comprising guides for sliding members. The supporting axle is provided with a rack $o$ with which there gears, on each side a worm wheel $o'$ actuated by a worm carried by a shaft $o^2$ operated by hand means of a hand wheel $o^3$, or by the motor in the case of automatic lifting.

Figure 4:
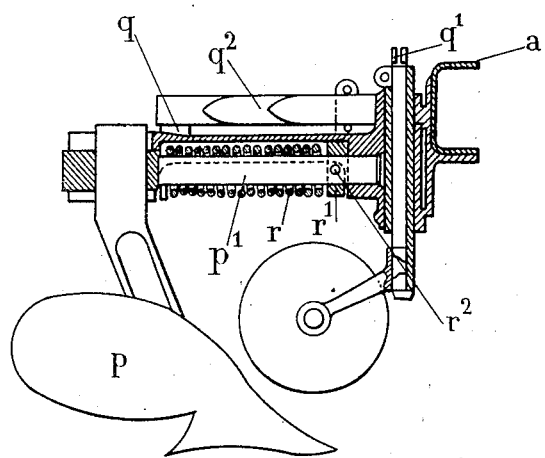
Fig. 4 shows separately a sectional elevation of one of the plow bodies, the section being taken on the line A—A of Fig. 5.
Figure 5:
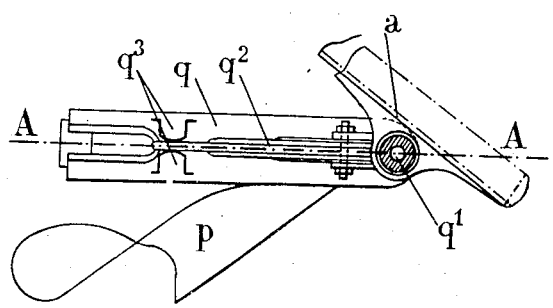
Fig. 5 shows a plan of the same body.

As hereinbefore set forth the frame $a$ carries on each side the plow bodies. Each of these bodies comprises a plow share $p$ supported by a beam $p'$ upon which are also mounted the mold board and the colter. The beam $p'$ is an easy frictional fit in a horizontal support $q$, which is angularly displaceable about a pivot $q'$, engaged in sleeves virtually integral with the frame $a$ (Figs. 4 and 5).

This support is normally maintained in the longitudinal axis of the plow by a plate spring $q^2$ connected to the frame and engaged between two stops $q^3$ virtually integral with this support $q$. This spring allows of angular displacements of the said support in the event of the plow share being turned aside in the ground by any obstacle.

Moreover inside the support $q$ is arranged a coil spring $r$, bearing on a ring $r'$, which is fixed by means of a safety peg $r^2$ on to the beam $p'$, and through the medium of which the body is connected to the support.

This spring $r$ constitutes a traction damper for the corresponding plow body, which is displaceable independently of the others in a longitudinal plane, in the event of its meeting with an obstacle in the ground. If this obstacle cannot be overcome, the safety peg breaks, and the plow share leaves its support, without constraining the machine to sink into the ground on account of the skidding of the driving wheels.

As hereinbefore described, the beams may likewise be displaced in a horizontal plane by pivoting about their supports $q'$.

Thanks to this method of mounting the plow bodies, it becomes possible under all circumstances to guide the plow, the lateral displacement of the bodies being independent of the position of the axle of the driving and steering wheels.

It is likewise to be observed that in the present machine the mold boards of the plow shares of both parts of the plow are arranged in such a way as to turn the earth in the same direction, irrespective of the direction in which the machine may be working, in such a way as to effect the type of plowing called level plowing.

Upon arriving at the end of the field, all that is necessary, in order to be ready to start again in the opposite direction, is to tip over the machine.

This arrangement of the mold boards in conjunction with that of the machine, in which the driving members are placed in the center of the said apparatus, enables plowing to be done without headlands and without leaving any part unworked.

Furthermore the bearing pressure, which is generally insufficient in ordinary balance plows, is insured, in the present machine, by part of the power of the motor, which works by pressing the hinder plow on to the ground.

It will be understood from the above that this plow occupies the minimum amount of space, since the driving and steering wheels replace the running wheels of the ordinary balance plows.

Figs. 6 and 7 of the drawing show another constructional form of the balance plow previously described.

In this constructional form the plow only comprises a single driving and steering wheel $b^2$ mounted on a hollow supporting axle, to the ends of which are fixed, on one side the motor $c$ and on the other side the clutch and the change-speed gear $c'$. This axle is mounted on a frame $s$, to which are fixed the two parts of the plow, which each comprise a supporting axle $s'$, at the ends of which are arranged the wheels $t$ and $t'$ that run on the land and in the furrow.

The beams of the plow bodies are engaged in supports $q$ capable of pivoting about trunnions $u$ in order to allow of angular displacements of the bodies. The latter are also provided with buffer draw springs and with safety-peg rings, as hereinbefore set forth.

Jointed connecting rods $v$ connected to supports virtually integral with the supporting axle $s'$ and to cross bars $v'$, in which there pivot the trunnions $u$, enable the plow bodies to be displaced in a vertical plane.

The plow with a single driving and steering wheel presents the same advantages as the one with two wheels. The modifications it exhibits are only due to the altered dimensions, the two types of plows being constructed on the same principle.

The arrangements set forth are only given by way of example, and the forms, dimensions and devices of detail may vary according to circumstances without departing from the principle of the invention, as set forth in the appended claims.

What I claim and desire to secure by Letters Patent of the United States is:—

1. A balanced motor plow comprising a hollow axle, a substantially V-shaped frame connected to said axle, two sets of plow shares carried by said frame and symmetrically arranged with respect to said axle, a motor rigidly mounted on said axle, a wheel rotatably mounted on said axle and a connection between said motor and wheel, said connection extending through said axle.

2. A balanced motor plow comprising a hollow axle, a substantially V-shaped frame connected to said axle, two sets of plow shares carried by said frame and symmetrically arranged with respect to said axle, a motor rigidly mounted on said axle, a rim co-axial with said axle, said rim being adapted to pivot about a vertical axis, a wheel rotatably mounted on said rim, and a connection between said motor and wheel, said connection being supported within said axle.

3. A balanced motor plow comprising a hollow axle, a substantially V-shaped frame connected to said axle, plow shares pivoted to said frame and symmetrically arranged with respect to said axle, a motor carried by said axle, a pair of radial trunnions rigid with said axle, a rim co-axial with said axle pivotally mounted on said trunnions, a wheel rotatably mounted on said rim, and a connection between said motor and wheel extending through said axle and one of said trunnions.

4. A power-actuated balance plow comprising two symmetrical groups of plow shares, two driving and steering wheels arranged in the middle part of the implement, a hollow axle on which both wheels are rotatably mounted, a V-shaped frame connected to the hollow axle and the two groups of plow shares, a motor actuating the wheels through the medium of a clutching device and of a change speed gear, the said motor, clutching device and change speed gear being supported by said axle and arranged between the two wheels, and means extending through said axle for transmitting the motion of the change speed gear to the two wheels.

5. A power-actuated balance plow comprising two symmetrical groups of plow shares, two driving and steering wheels arranged in the middle part of the implement, a hollow axle on which both wheels are rotatably mounted, a V-shaped frame connected to the hollow axle and the two groups of plow shares, a motor, a clutching device and a change speed gear supported by said axle and arranged between the two wheels, and means comprising a worm a toothed wheel and a differential, and two horizontal shafts located with the hollow axle for transmitting motion from said change speed gear to said wheels.

6. A power-actuated balance plow comprising two symmetrical groups of plow shares, two driving and steering wheels arranged in the middle part of the implement, a hollow axle on which both wheels are rotatably mounted, a V-shaped frame connected to the hollow axle and the two groups of plow shares, a motor, a clutching device and a change speed gear supported by said axle and arranged between the two wheels, and driving connections between said change speed gear and wheels comprising a worm, a toothed wheel and a differential, two horizontal shafts located within the hollow axle, groups of bevel pinions located in the axis of the two wheels and actuated by the horizontal shafts, and means extending in vertical planes passing through each wheel for transmitting to said wheels the motion of said pinions.

7. A power-actuated balance plow comprising two symmetrical groups of plow shares, two driving and steering wheels arranged in the middle part of the implement, a hollow axle on which both wheels are rotatably mounted, a V-shaped frame connected to the hollow axle and the two groups of plow shares, a motor, a clutching device and a change speed gear supported by said axle and arranged between the two wheels, driving connections between said change speed gear and wheels comprising a worm, a toothed wheel and a differential, two horizontal shafts located within the hollow axle, groups of bevel pinions, located in the axis of the two wheels, a crown gear secured to each wheel and vertical shafts driven by pinions and adapted to rotate said crown gears, and a claw clutch arranged between the pinions of each group for altering the direction in which the wheels rotate.

8. A power-actuated balance plow comprising two driving and steering wheels, a hollow axle on which the two wheels are rotatably mounted, a frame connected to the axle, a motor carried by said axle, driving connections between said motor and wheels extending through said axle, two symmetrical groups of plow shares with their beams arranged on opposite sides of the driving wheels, a support for each beam pivoted on the frame for horizontal movement, a plate spring holding each beam in the longitudinal axis of the plow, a damping spring interposed between each beam and its support, and a safety peg for holding each beam in its support.

This foregoing specification of my "power-actuated balance plow", signed by me this 17th day of April, 1918.

CHARLES MARIUS MOTTE.

Witnesses:
   CHAS. P. PRESSLY,
   FRANÇOIS WEBER.